(12) United States Patent
Hing

(10) Patent No.: US 9,738,059 B2
(45) Date of Patent: Aug. 22, 2017

(54) EXERCISE MATS, SYSTEMS OF EXERCISE MATS, AND RELATED METHODS

(71) Applicant: Plank, LLC, Charlestown, MA (US)

(72) Inventor: Doreen Mary Hing, Boston, MA (US)

( * ) Notice: Subject to any disclaimer, the term of this patent is extended or adjusted under 35 U.S.C. 154(b) by 0 days.

(21) Appl. No.: 14/638,412

(22) Filed: Mar. 4, 2015

(65) Prior Publication Data

US 2015/0251045 A1    Sep. 10, 2015

Related U.S. Application Data

(60) Provisional application No. 61/947,805, filed on Mar. 4, 2014.

(51) Int. Cl.
*A47G 9/06*    (2006.01)
*B32B 37/12*    (2006.01)
(Continued)

(52) U.S. Cl.
CPC .......... *B32B 37/12* (2013.01); *A63B 21/4037* (2015.10); *A63B 71/0054* (2013.01); *B32B 5/18* (2013.01); *B32B 7/12* (2013.01); *B32B 27/065* (2013.01); *B41M 5/28* (2013.01); *A63B 2071/0694* (2013.01); *A63B 2209/02* (2013.01); *B32B 2255/10* (2013.01); *B32B 2255/24* (2013.01); *B32B 2307/30* (2013.01); *B32B 2307/302* (2013.01); *B32B 2307/4023* (2013.01); *B32B 2307/75* (2013.01); *B32B 2471/04* (2013.01); *B41M 5/281* (2013.01); *B41M 5/282* (2013.01); *B41M 5/283* (2013.01); *B41M 5/284* (2013.01); *B41M 5/287* (2013.01); *Y10T 156/10* (2015.01)

(58) Field of Classification Search
CPC .. B32B 37/12; B32B 7/12; B32B 5/18; B32B 27/065; B32B 2307/75; B32B 2255/10; B32B 2255/24; B32B 2307/4023; B32B 2307/302; B32B 2471/04; B32B 2307/30; A63B 71/0054; A63B 21/4037; Y10T 156/10
See application file for complete search history.

(56) References Cited

U.S. PATENT DOCUMENTS 6,416,853 B1 * 7/2002 Nakashima ............ A63H 33/22
428/29
7,108,635 B2 * 9/2006 Howlett-Campanella A63B 21/4037
482/23
(Continued)

OTHER PUBLICATIONS

Chandler, Nathan, "How Thermochromic Ink Works," HowStuffWorks website, http://electronics.howstuffworks.com/gadgets/other-gadgets/thermochromic-ink.htm,pp. 1-6, dl Feb. 18, 2014.
(Continued)

*Primary Examiner* — David E Sosnowski
(74) *Attorney, Agent, or Firm* — J. Bennett Mullinax, LLC

(57) ABSTRACT

Exercise mats, systems of exercise mats, and related methods of making and/or using the same are provided herein. More specifically, the subject matter disclosed herein relates to exercise mats, such as yoga mats, and systems of exercise mats that provide visual cues and/or different levels of tackiness to provide different levels of grip to optimize a user's connection to the mat and methods related to the exercise mats.

9 Claims, 7 Drawing Sheets

(51) Int. Cl.
*A63B 21/00* (2006.01)
*B32B 5/18* (2006.01)
*B32B 7/12* (2006.01)
*B32B 27/06* (2006.01)
*A63B 71/00* (2006.01)
*B41M 5/28* (2006.01)
*A63B 71/06* (2006.01)

(56) References Cited

U.S. PATENT DOCUMENTS

| | | | | |
|---|---|---|---|---|
| 7,208,208 | B1* | 4/2007 | Lane | A47G 27/0243 428/172 |
| 2002/0142888 | A1* | 10/2002 | Marques | A63B 6/00 482/23 |
| 2004/0214692 | A1* | 10/2004 | Koenig | A63B 21/4037 482/23 |
| 2007/0020449 | A1* | 1/2007 | Hing | A63B 21/4037 428/318.4 |
| 2010/0016125 | A1* | 1/2010 | Bellandi | A63B 6/00 482/4 |
| 2011/0035878 | A1* | 2/2011 | Rouse | A47G 27/0237 5/417 |
| 2012/0124740 | A1* | 5/2012 | Castle | A47D 15/003 5/420 |
| 2012/0240336 | A1* | 9/2012 | Dandapure | A63B 6/00 5/417 |
| 2012/0324645 | A1* | 12/2012 | Lehr | A63B 21/4037 5/420 |
| 2014/0068858 | A1* | 3/2014 | Wambeke | A47G 9/062 5/420 |
| 2014/0259399 | A1* | 9/2014 | Tsai | A63B 21/00105 5/420 |

OTHER PUBLICATIONS

Strickland, Jonathan, "How Fabric Displays Work," HowStuffWorks website, http://electronics.howstuffworks.com/gadgets/high-tec-gadgets/fabric-display2.htm,downloaded Feb. 18, 2014.

"Liquid Crystals," Color Change website, http://www.colorchange.com/liquidcrystals? tmpl=component&print=1&page=, downloaded Feb. 18. 2014.

"Microencapsulation," Color Change website, http://www.colorchange.com/encapsulation? tmpl=component&print=1&page=, downloaded Feb. 18, 2014.

Handbook of Thermochromic Liquid Crystal Technology, 1991, pp. 1-36, Hallcrest, Glenview, Illinois, USA.

"Leuco Dyes," Color Change website, htpp://www.colorchange.com/leuco-dyes? tmpl=component&print=1&page=, downloaded Feb. 18, 2014.

"Thermochromic Liquid Crystals," Color Change website, htpp://www.colorchange.com/faq? tmpl=component&print=1&page=, downloaded Feb. 18, 2014.

Stasiek, et al., "Thermochromic Liquid Crystals Applied for Heat Transfer Research," Opto-Electronics Review, 2002, pp. 1-10, vol. 10, No. 1.

"Thermochromic Materials," Open Materials website, htpp://www.openmaterials.org/materials-101-thermochromic/, downloaded Feb. 18, 2014.

Malamut, Melissa, "MIT Students Created a Light Up Yoga Mat," Boston Magazine website, http://www.bostonmagazine.com/health/blog/2014/02/06/light-yoga-mat/, pub. Feb. 6, 2014.

"Thermochromic Technology," Color Change website, htpp://www.colorchange.com/thermochromic? tmpl=component&print=1&page=, downloaded Feb. 18, 2014.

* cited by examiner

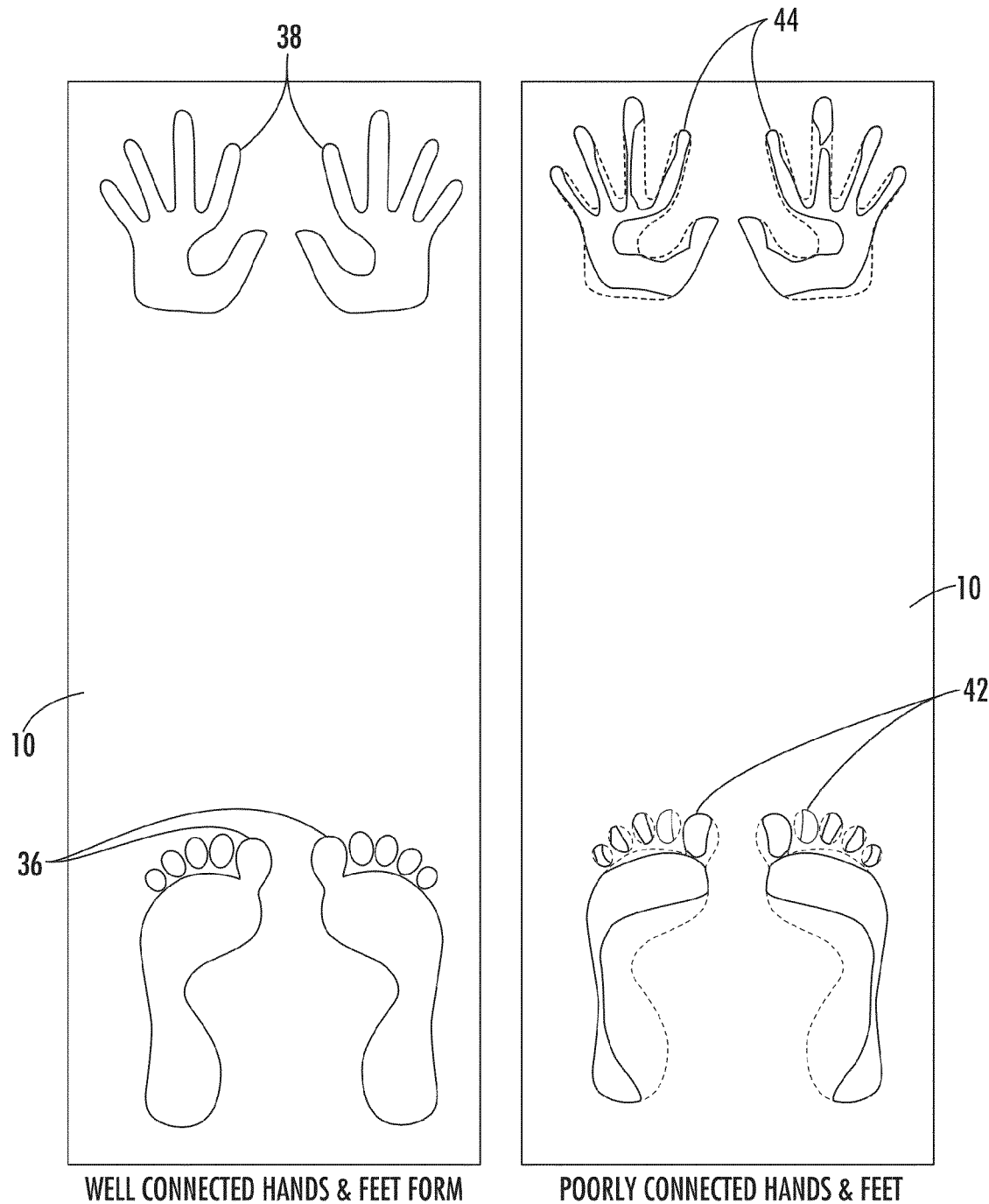

EXERCISE MATS, SYSTEMS OF EXERCISE MATS, AND RELATED METHODS

RELATED APPLICATION

The presently disclosed subject matter claims the benefit of U.S. Provisional Patent Application Ser. No. 61/947,805, filed Mar. 4, 2014, the disclosure of which is incorporated herein by reference in its entirety.

TECHNICAL FIELD

The subject matter disclosed herein relates to exercise mats, systems of exercise mats, and related methods. In particular, the present subject matter relates to exercise mats, such as yoga mats, and systems of exercise mats that provide visual cues and/or different levels of grip to optimize a user's connection to the mat and systems and methods related to the exercise mats.

BACKGROUND

Yoga helps practitioners become more aware of their body through a variety of yoga poses. These yoga poses counteract the bad habits of everyday life in which people have a tendency to fall into bad postures, such as slumping, slouching or swaying, whether the body is at rest or in motion. Yoga poses are designed to bring awareness of how to align muscles equitably around the skeletal structure and align the networks of connective tissue and nervous tissue so that they are positioned optimally to perform at their best.

When the foundational body part muscles, mostly hands and feet, but not excluding, forearms, backs or legs, are connected to the yoga mat, the muscles of the supporting limbs can fully engage. The connective tissues that start at the body's extremities become switched on and sets off a biomechanical chain reaction that activates their connecting muscles and tissue to evenly align around the body's skeletal structure. As a result, strength and endurance is accessible. Trapped connective tissue, such as blood vessels, and trapped nervous tissue caused by misaligned musculature can be freed and are able to expand, transforming tight and solid tissue masses into more beneficial soft tissue mass that can support the efficient flow of good and bad body resources. Proper alignment of the musculature and body's delivery system enables strength, endurance and healing to be readily and optimally accessible.

As the practitioner moves from pose to pose or as time is spent in a single pose for study and endurance, the opportunity for sliding of the foundation forming body parts can occur. This sliding action is the result of uncontrolled force and body weight collapsing onto the yoga mat.

Yoga mats normally have a surface that provides some level of grip to the parts of the practitioner's body that contact the mat. This grip provides security and can reduce, minimize, or prevent the practitioner from sliding out of poses, once they believe they have created their optimum pose shape. Conventional wisdom is that the more grip the surface of the mat provides the better the yoga mat performs. This higher grip level, however, provides a false sense of security that promotes bad habits and poor pose-creating behaviors. While the higher grip level makes it easier for beginners to hold attempted poses, the promotion of poor pose-creating behaviors provide opportunities for habits to develop that can lead to injury.

In particular, yoga mats with high grip levels give the practitioner a false sense of security because it holds the practitioner in a pose whether it is well constructed or not. While slippage is prevented, the sense of ease and personal strength is compromised. When using yoga mats with high grip levels, the practitioners do not need to understand the laws of friction and motion that affect the biomechanics of the body while the practitioners create yoga poses.

Further, yoga mats that are generally available today do not provide feedback to the practitioner of optimal biomechanics and placements of body parts that form foundations of respective yoga poses that can help teach the practitioner the proper positions and placements of such body parts to increase ease and endurance for the poses requested of a yoga practice. As a result, often injury and excessive straining occurs as practitioners force themselves into poses which would be easier and safer if the foundations were broad & solid to cause connective tissues to align that allows the muscles to distribute evenly around its connecting bone structure.

Therefore, a need exists for exercise mats and exercise mat systems that better promote correct posture and poses and optimal weight distribution and promote quality of pressure of foundational body parts of the practitioners to increase the benefits provided by yoga and decrease the likelihood of injury.

SUMMARY

It is an object of the present disclosure to provide novel exercise mats, systems of exercise mats, and related methods of making and/or using the same. More specifically, the subject matter disclosed herein relates to exercise mats, such as yoga mats, and systems of exercise mats that provide visual cues and/or different levels of tackiness to provide different levels of grip to optimize a user's connection to the mat and methods related to the exercise mats.

While a few objects of the presently disclosed subject matter have been stated hereinabove, which can be achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter to one of ordinary skill in the art is set forth more particularly in the remainder of the specification and in the other documents, pictures and figures attached herewith, including reference to the accompanying figures in which:

FIG. 4A illustrates a top plan view of the embodiment of the exercise mat according to FIG. 1 where the practitioner's foundational connections of his or her hands and feet on the exercise mat are registered for a period of time during and after use showing good and correct foundational connections to provide informational feedback about the foundational connections according to the subject matter disclosed herein;

FIG. 4B illustrates a top plan view of the embodiment of the exercise mat according to FIG. 1 where the practitioner's foundational connections of his hands and feet on the exercise mat are registered for a period of time during and after use showing incorrect foundational connections to provide informational feedback about the foundational connections according to the subject matter disclosed herein;

Figure 1:
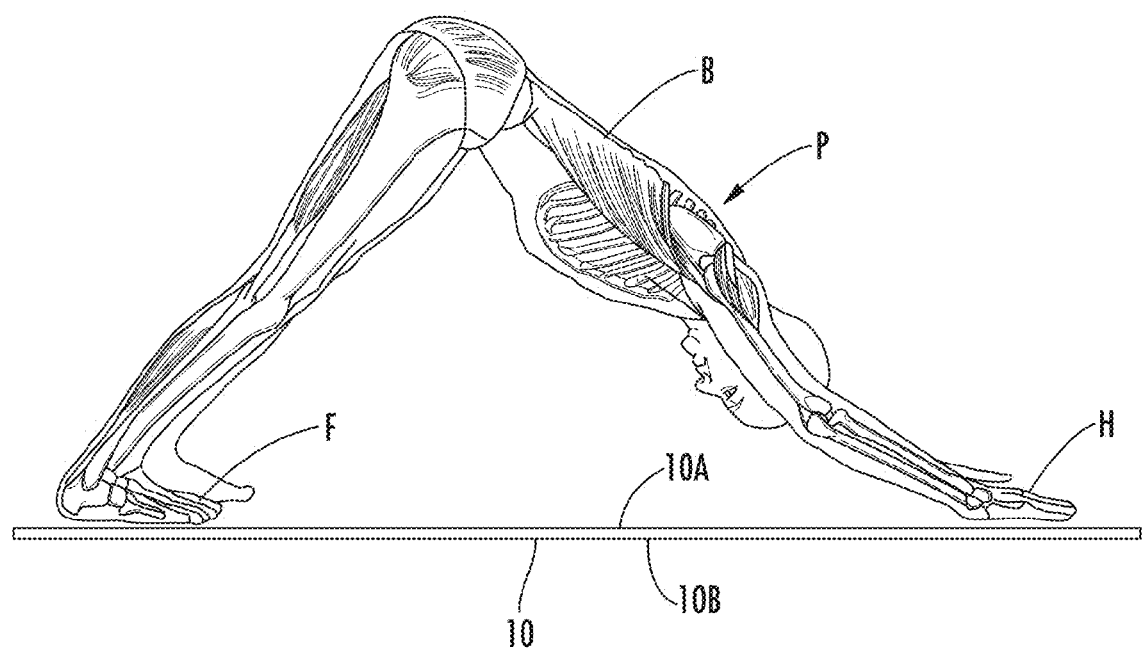
FIG. 1 illustrates a side view of a practitioner in a yoga pose using an embodiment of an exercise mat according to the subject matter disclosed herein.

Repeat use of reference characters in the present specification and drawings is intended to represent the same or analogous features or elements of the invention.

DETAILED DESCRIPTION

Reference will now be made in detail to the description of the present subject matter, one or more examples of which are shown in the pictures and figures. Each example is provided to explain the subject matter and not as a limitation. In fact, features illustrated or described as part of one embodiment may be used in another embodiment to yield still a further embodiment. It is intended that the present subject matter cover such modifications and variations.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, in the present disclosure, when a feature, element, component, region, layer and/or section is being described as "top", "bottom," "front," "rear," "side," etc., it should be understood that such terms are relative and not absolute. Thus something that is described with the adjective of "top" may also be considered on a side or a bottom depending on the orientation of the larger subject being described. Additionally, when a feature, element, component, region, layer and/or section is being described as "under,", "on," or "over" another feature, element, component, region, layer and/or section, it is to be understood that the features, elements, components, regions, layers and/or sections can either be directly contacting each other or have another feature, element, component, region, layer and/or section between the them, unless expressly stated to the contrary. Similarly, directional movement, such as "back and forth," "forward," "backward," "up," "down," or the like are to be understood as relative descriptions that can change depending on the orientation of the subject matter relative to the viewer. Thus, these terms are simply describing the relative position of the features, elements, components, regions, layers and/or sections to each other and do not necessarily mean an absolute position or direction since the relative position above or below depends upon the orientation of the subject matter to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of an exercise or yoga mat and are not intended to limit the scope of the subject matter disclosed herein.

"Tack" or "Tackiness" as used herein means a sticky or adherent quality or condition of a surface of a substance or substrate that provides a level of frictional forces to be overcome for objects or body parts residing against that surface to slide. For example, these terms apply to the quality or condition of a top outer surface of an exercise or yoga mat that provides a level of frictional forces to be overcome for a foot, hand, or other body part of a yoga practitioner that resides against that surface to slide. Thus, for example, a surface with a higher tackiness or higher tack may be considered to have a higher coefficient of friction and require higher frictional forces that must be overcome for a body part contacting the surface to slide as compared to a surface that has a lower coefficient of friction and requires lower frictional forces that must be overcome for a body part contacting the surface to slide. Similarly, a surface that increases in tackiness or tack comprises a surface that has a higher tackiness or tack compared to a reference tackiness of the surface due to a change in some variable associated with that surface meaning that the amount frictional forces needed to be overcome has increased from the reference tackiness of the surface. An example of a reference tackiness can include an initial tackiness of a surface before a respective variable associated with the surface is changed. Thus, an exercise or yoga mat that has a higher tackiness or a higher tack has greater traction than an exercise or yoga mat that a lower tackiness or tack.

"Heat-activated connect surface" as used herein means an outer surface of an exercise or yoga mat that increases in tackiness or tack at positions on the surface that are exposed to heat and pressure from contact of a portion of a body of a practitioner using the exercise or yoga mat.

"Heat-sensitive imaging layer" as used herein means a layer within an exercise or yoga mat that changes its appearance at portions of the layer that are exposed to heat and pressure from a portion of a body of a practitioner against an outer surface of the exercise or yoga mat.

"Proper" or "correct" yoga poses as used herein means yoga poses in which the body of the practitioner is biomechanically aligned in such a manner that tight and dense tissue masses, such as connective tissue and nervous tissue, within the body are more optimally positioned to transform the tight and solid tissue masses into more beneficial soft tissue mass that can support the efficient flow of good and bad body resources. Such "proper" or "correct" yoga poses may differ in nature depending on the yoga philosophy/methodology, such as Hatha Yoga, Iyengar Yoga, Ashtanga Yoga, or Anusara Yoga to name a few examples.

"Connection" as used herein means the ability for the practitioner when entering a yoga pose to provide firm foundations of body parts on the mat to better optimize weight distribution of the body and quality of pressure of foundational body parts. Such connections may also include the positioning of the foundational body parts on the mat.

"Foundational body parts" as used herein means the portions of a practitioner's body that contact an exercise mat and over which weight is distributed to support the body of the practitioner and form a foundation of a yoga pose that the practitioner is trying to assume.

FIG. 1 illustrates an exercise mat 10 according to the present disclosure that is being used by a practitioner P. The exercise mat 10 can be, for example, a yoga mat. The yoga mat 10 can be placed with a bottom surface 10B on a surface such as the ground or a floor with a top outer surface 10A facing outward. The practitioner P can then position appropriate body parts, such as feet F and hands H, against the top outer surface 10A of the yoga mat 10 to provide proper foundational connection. When yoga poses are properly constructed by the practitioner P on the yoga mat 10, sliding does not occur, as a solid foundation is created first, by connecting a broad body surface area to a yoga mat 10 that is the foundation, i.e., the starting point for developing stronger supporting limbs, i.e., arms/legs that biomechanically & efficiently lift the body B of the practitioner P into its correct form. What typically occurs when foundations are not solid, since the muscles of the supporting limbs are not fully engaged, the body B has no strength to lift & hold itself into the yoga pose. Hence, the practitioner P is often seen to be collapsing the body weight onto the joints and struggling to find oxygen. Internally, the delivery system is compromised within the tight and constricted musculature and the opportunity for impingement or trapping the network of connective tissue and nervous tissue is increased as they become unevenly distributed around the framework/skeletal structure created by the new yoga pose.

To help the practitioner P learn the good and correct foundational connections of his body parts, such as feet F and hands H in the pose shown, for each yoga pose and monitor his progress toward achieving and maintaining these good and correct foundational connections of his body parts of each yoga pose during his use of the yoga mat 10, the yoga mat 10 can provide visual feedback that registers the foundational connections of the body parts of the practitioner P on the yoga mat 10 through a heat-sensitive imaging layer that can be seen by the practitioner P when looking at the top outer surface 10A of the yoga mat 10. By using the visual feedback seen at the top outer surface 10A of the yoga mat 10 that is provided by the heat-sensitive imaging layer of the yoga mat 10, the practitioner P can begin to understand what it feels like when he obtains each proper yoga pose and he can began to obtain both a mental and muscular memory of the positioning of the body B for each proper pose.

Figure 2A:
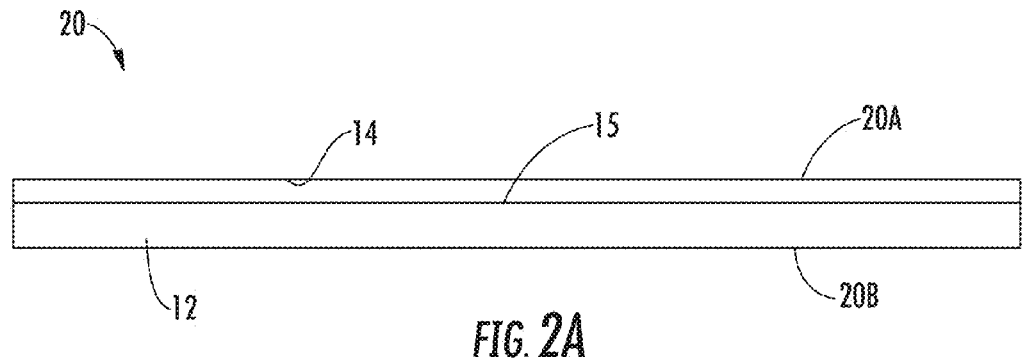
FIG. 2A illustrates a schematic view of vertical cross-section of an embodiment of an exercise mat that can be used for yoga exercises according to the subject matter disclosed herein.
Figure 2B:
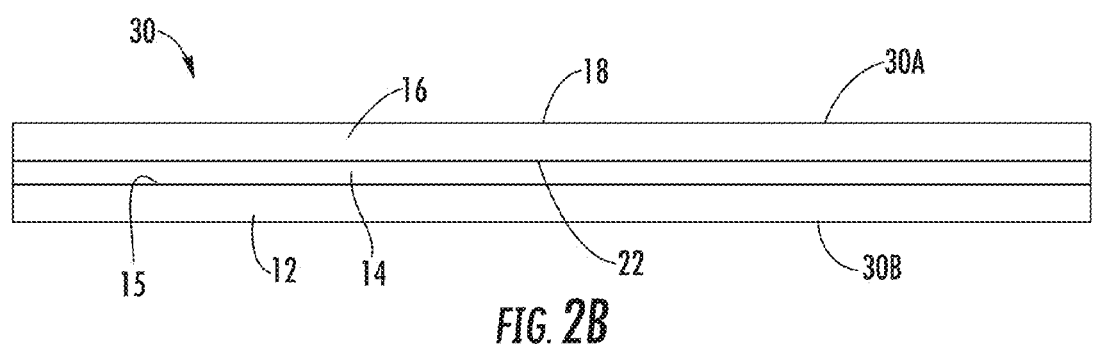
FIG. 2B illustrates a schematic view of vertical cross-section of another embodiment of an exercise mat that can be used for yoga exercises according to the subject matter disclosed herein.
Figure 2C:
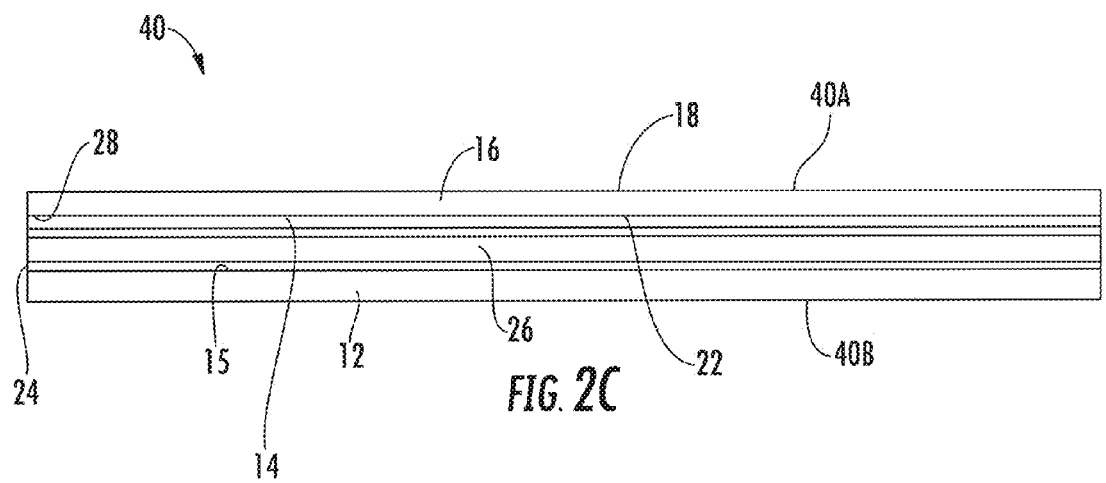
FIG. 2C illustrates a schematic view of vertical cross-section of a further embodiment of an exercise mat that can be used for yoga exercises according to the subject matter disclosed herein.

Exercise mats can be constructed in a variety of different manners and a variety of different constructions. As examples, FIGS. 2A-2C show schematic representations of vertical cross-sections of different embodiments of exercise mats that have heat-sensitive imaging layers that can be the same or similar to the yoga mat 10 shown in FIG. 1, In FIG. 2A, a performance enhancing exercise mat, generally designated 20, is provided. The exercise mat 20 can have a bottom surface 20B that can be placed on the ground or floor when in use and a top outer surface 20A that faces outward and can be engaged by a practitioner during an exercise routine such as yoga or pilates. The exercise mat 20 can comprise a base layer 12 having a top surface 15 and a bottom surface that can form the bottom surface 20B of the exercise mat 20. The exercise mat 20 can also comprise a heat-sensitive imaging layer 14 on the top surface 15 of the base layer 12. The heat-sensitive imaging layer 14 can form the top outer surface 20A of the exercise mat 20. The heat-sensitive imaging layer 14 can permit registration of placement of one or more body parts of a practitioner using the exercise mat 20 against the top outer surface 20A of the exercise mat 20 due to the heat of the body part in contact with the top outer surface 20A of the exercise mat 20 being transferred to the heat-sensitive imaging layer 14.

The base layer 12 of exercise mat 20 can comprise a material that can provide cushioning to the practitioner's body parts that come in contact with the exercise mat 20 during the exercise routine. The base layer 12 can be resilient and in some embodiments can be elastic to provide a stretchable feature to the exercise mat 20. Thus, the base layer 12 can comprise a variety of materials. For example, in some embodiments, the base layer 12 can comprise mat of cellulosic material such as a woven reed or grass mats or terry woven cotton or rayon fabrics. In some embodiments, the base layer 12 can comprise synthetic material. In some embodiments, the base layer 12 can comprise a foam substrate. For example, the base layer 12 can comprise an open cell foam material that exhibits a resiliency that provides a cushioning effect to a practitioner during use. As further examples, the base layer 12 of exercise mat 20 can comprise a foam substrate of at least one of thermoplastic elastomer, polyurethane synthetic rubber, natural rubber, polyvinyl chloride polymer, polyethylene, styrene-butadiene rubber, thermoplastic rubber, thermoplastic polyolefin elastomer, thermoplastic polyurethane, styrene-butadiene-styrene, styrene ethylene butylene styrene, nitrile-butadiene rubber, ethylene propylene diene monomer rubber and latex.

To provide the registration of body parts of a practitioner that firmly contact the exercise mat 20, the heat-sensitive imaging layer 14 can comprise a thermochromic substance that changes its appearance when exposed to the body heat of the practitioner that serves as a heat source. In particular, certain properties of the thermochromic substances can change when exposed to a firmly placed body part that transfers heat and thereby raises the temperature of the thermochromic substance. The thermochromic substance can be selected based on the temperature range and exposure time desired for providing the visual feedback of the changed property which is usually a change of color or disappearance of color from the thermochromic substance. For example, the heat-sensitive imaging layer 14 can comprise at least one of thermochromic inks, dyes, pigments, or liquid crystals. In some embodiments, such heat-sensitive imaging layer 14 that are inks, dyes, or pigments can be applied on the top surface 15 to the base layer 12 of exercise mat 20. For example, the heat-sensitive imaging layer 14 can be printed on, or directly on, the top surface 15 of the base layer 12 of exercise mat 20.

Thus, in some embodiments, the types of thermochromic substances used can be selected based on the construction of the exercise mat, the type of exercise or yoga to be practiced, the appearance of the changed thermochromic substance, and/or the temperature at which the exercise or yoga is to be practiced. For example, the type of thermochromic substances may be different for a yoga mat used for Vinyasa Yoga as compared to Hatha Yoga or Ashtanga Yoga based on the time it takes the thermochromic substance to change appearance. Similarly, the type of thermochromic substances may be different for a yoga mat used for Bikram, or Hot, Yoga as compared to Hatha Yoga or Ashtanga Yoga due to the needed temperature range for the change in appearance in the mat based on the temperature in which the yoga is practiced. Thus, in some embodiments, different thermochromic substances can be used based on the environments in which the mat is intended to be used, such hot, temperate, or cold environments, and other situational factors.

In some embodiments, the heat-sensitive imaging layer 14 can also comprise a print-receiving substrate on which the thermochromic inks, dyes, pigments, or liquid crystals are printable. For example, the print-receiving substrate can comprise one of cloth fabric, plastic fiber fabric, plastic film and paper. In some embodiments, the heat-sensitive imaging layer can comprise an encapsulation layer that encapsulates the thermochromic substance, such as liquid crystals therein. The print-receiving substrate or the encapsulation layer can be secured to the top surface 15 of the base layer 12 in various manners. For example, in some embodiments, the print-receiving substrate or the encapsulation layer can be secured to the top surface 15 of the base layer 12 by an adhesive. In some embodiments, the print-receiving substrate or the encapsulation layer can be secured to the top surface 15 of the base layer 12 by stitching. The print-receiving substrate or the encapsulation layer can also have a lower tensile elasticity than the base layer 12 that can inhibit excessive stretching when the exercise mat 20 is placed under tension.

FIG. 2B shows a vertical cross-section of another embodiment of an exercise mat generally designated 30, which can have a bottom surface 30B that can be placed on the ground or floor when in use and a top outer surface 30A that faces outward and can be engaged by a practitioner. As with exercise mat 20, the exercise mat 30 can be used for practicing yoga and can comprise a base layer 12 having a top surface 15 and a bottom surface that can form the bottom surface 30B of the exercise mat 30. The exercise mat 30 can also comprise a heat-sensitive imaging layer 14 on the top surface 15 of the base layer 12. As above, the heat-sensitive imaging layer 14 can comprise one or more thermochromic substances that permit registration of placement of one or more body parts of a practitioner that are positioned against the exercise mat 30. For example, the heat-sensitive imaging layer 14 can comprise at least one of thermochromic inks, dyes, pigments, or liquid crystals. The exercise mat 30 can further comprise a top protective layer 16 that has a top outer surface 18 and a bottom inner surface 22. The top outer surface 18 of the top protective layer 16 can also serve as the top outer surface 30A of the exercise mat 30 that a practitioner contacts during use of the exercise mat 30. The top protective layer 16 can be positioned, and secured, over the heat-sensitive imaging layer 14 with the bottom inner surface 22 of the top protective layer 16 above the heat-sensitive imaging layer 14. The top protective layer 16 can comprise material that permits the transfer of heat from the one or more body parts of a practitioner that are firmly positioned against the top outer surface 18 through the top protective layer 16 to the heat-sensitive layer 14.

As above, in some embodiments, the base layer 12 can comprise a foam substrate. For example, the base layer 12 of exercise mat 30 can comprise a foam substrate of at least one of thermoplastic elastomer, polyurethane synthetic rubber, natural rubber, polyvinyl chloride polymer, polyethylene, styrene-butadiene rubber, thermoplastic rubber, thermoplastic polyolefin elastomer, thermoplastic polyurethane, styrene-butadiene-styrene, styrene ethylene butylene styrene, nitrile-butadiene rubber, ethylene propylene diene monomer rubber and latex. Also similarly, the heat-sensitive imaging layer 14 can comprise at least one of thermochromic inks, dyes, pigments, or liquid crystals.

The top protective layer 16 can be a light permissive layer. For example, the top protective layer can be transparent or at least translucent. In this manner, the changing of the appearance, i.e., the changing of the color, of the heat-sensitive imaging layer 14 can be visually observed by the practitioner after the practitioner changes yoga poses or steps back from the yoga mat. The practitioner can then see if her or his foundational positioning, or connection, to the yoga mat was proper and correct. In some embodiments, the top protective layer 16 can comprise a closed cell clear polymer. For example, the top protective layer 16 can comprise at least one of polyurethane (PU), natural rubber, latex silicon rubber and synthetic rubber. For instance, in some embodiments, the top protective layer 16 can comprise polyurethane (PU).

Further, in some embodiments, the top protective layer 16 can comprise a heat activated connect surface that increases in tackiness when exposed to body heat from contact of body parts of a user against the top outer surface 18 of the top protective layer 16 of the exercise mat 30. In this manner, the frictional grip of the mat 30 in such embodiments can increase at the point of firm contact at the foundational connection of the practitioner's body parts with the mat 30 as each yoga pose is held. Thus, the top outer surface 18 of the top protective layer 16 can have a tackiness that increases as heat from the body of the practitioner increases the temperature level of the protective layer 16 where the body contacts the protective layer 16.

Additionally, in some embodiments, the top outer surface 18 of the top protective layer 16 can comprise a smooth planar surface that makes the practitioner initially work to hold each yoga pose. Alternatively, in some embodiments, the top outer surface 18 of the top protective layer 16 can comprise a textured surface configured to provide a higher friction as compared to the smooth planar surface to allow the user to hold a yoga pose more easily at the beginning. Such a textured surface can be beneficial for novice yoga practitioners or a helpful alternative for other practitioners.

The exercise mat 30 can, thus, have a transparent heat-activated connect surface 18 on its top protective layer 16 that is initially smooth to the touch As more of the body of the practitioner connects to the exercise mat 30, the more traction is created. This positive increase in traction, from low traction to high traction, can provide a mental and musculature memory that serves as feedback and information for the practitioner, as poses are held for periods of time or as the practitioner moves from pose to pose.

The top protective layer 16 can also be secured to the base layer 12 by an adhesive. Alternatively, the top protective layer 16 can be secured to the base layer in other known manners. The heat-sensitive imaging layer 14 can be printed on the inner bottom surface of the top protective layer in some embodiments. Alternatively, the thermochromic substances of the heat-sensitive imaging layer 14 can be printed on a print-receiving substrate or encapsulated in an encapsulation layer of the heat-sensitive imaging layer 14 with the top protective layer 16 being secured thereto in a known manner, such as, with a heat transferrable adhesive.

FIG. 2C shows a different construction for an exercise mat, generally designated 40, that also provides a heat-sensitive imaging layer 14 and base layer 12 and can be used to practice yoga. The exercise mat 40 can have a bottom surface 40B that can be placed on the ground or floor when in use and a top outer surface 40A that faces outward and can be engaged by a practitioner. The base layer can comprise a stretchable foam layer 12 that has a bottom surface that forms the bottom surface 40B of the exercise mat 40. The exercise mat 40 can also comprise a tensile-strained layer 26 that defines opposing top and bottom surfaces and a first adhesive layer 24 that adheres the tensile-strained layer 26 to the foam layer 12. The first adhesive layer 24 can be distributed in a whole area between the foam layer 12 and the tensile-strained layer 26. A second adhesive layer 28 can be provided that can cover the whole area of the top surface of the tensile-strained layer 26. The exercise mat 40 can also comprise a light-transmissive protective layer 16 that can be adhered to the second adhesive layer 28. The heat-sensitive imaging layer 14 can be attached to one of the second adhesive layer 28 and the light-transmissive protective layer 16. Thereby, the heat-sensitive imaging layer 14 can be set between the second adhesive layer 28 and the light-transmissive protective layer 16.

In some embodiments, the heat-sensitive imaging layer 14 of the exercise mat 40 can be formed on the second adhesive layer 28 in a semi-cured state using one of the techniques of transfer printing, cold transfer printing, transfer printing, or movable printing. In some embodiments of the exercise mat 40, the light-transmissive protective layer 16 can be formed by coating a predetermined material on the second adhesive layer 28 and the heat-sensitive imaging layer 14 and then heat-curing the applied predetermined material. In some embodiments of the exercise mat 40, the light-transmissive protective layer 16 can be a cured sheet member and the heat-sensitive imaging layer 14 can be located on a bottom surface of the light-transmissive protective layer 16. In some embodiments, the light-transmissive protective layer 16 of the exercise mat 40 can be bonded with the heat-sensitive imaging layer 14 to the second adhesive layer 28. The tensile strained layer 26 can comprise cloth fabric, plastic fiber fabric, plastic film or paper. In some embodiments, the tensile-strained layer 26 can be made of a fabric with the first adhesive layer 24 and the second adhesive layer 28 being embedded in the tensile-strained layer 26.

Figure 3A:
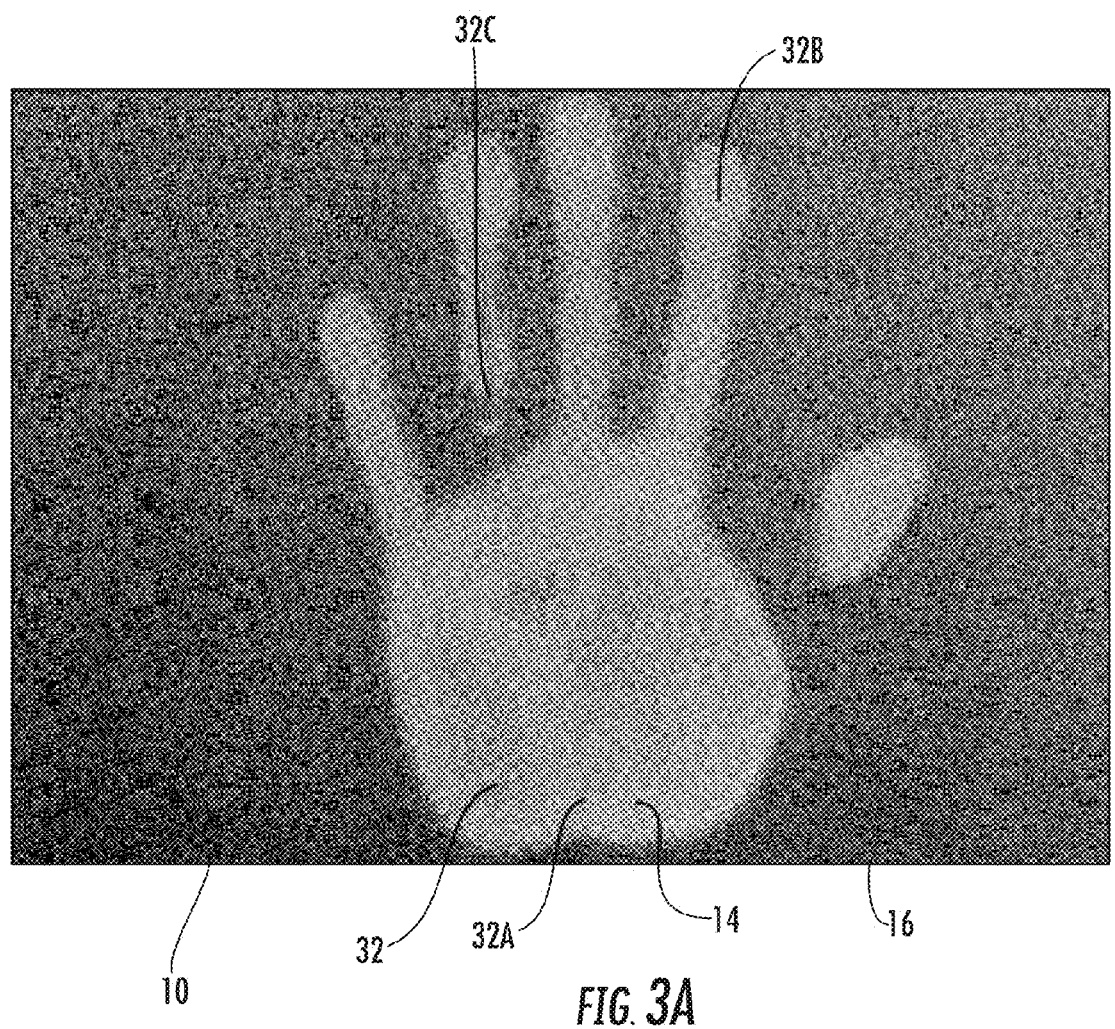
FIG. 3A illustrates a top plan view of a portion of an embodiment of an exercise mat according to the subject matter disclosed herein and similar to those illustrated in FIGS. 1-2C showing a registration of a practitioner's left hand on the exercise mat.
Figure 3B:
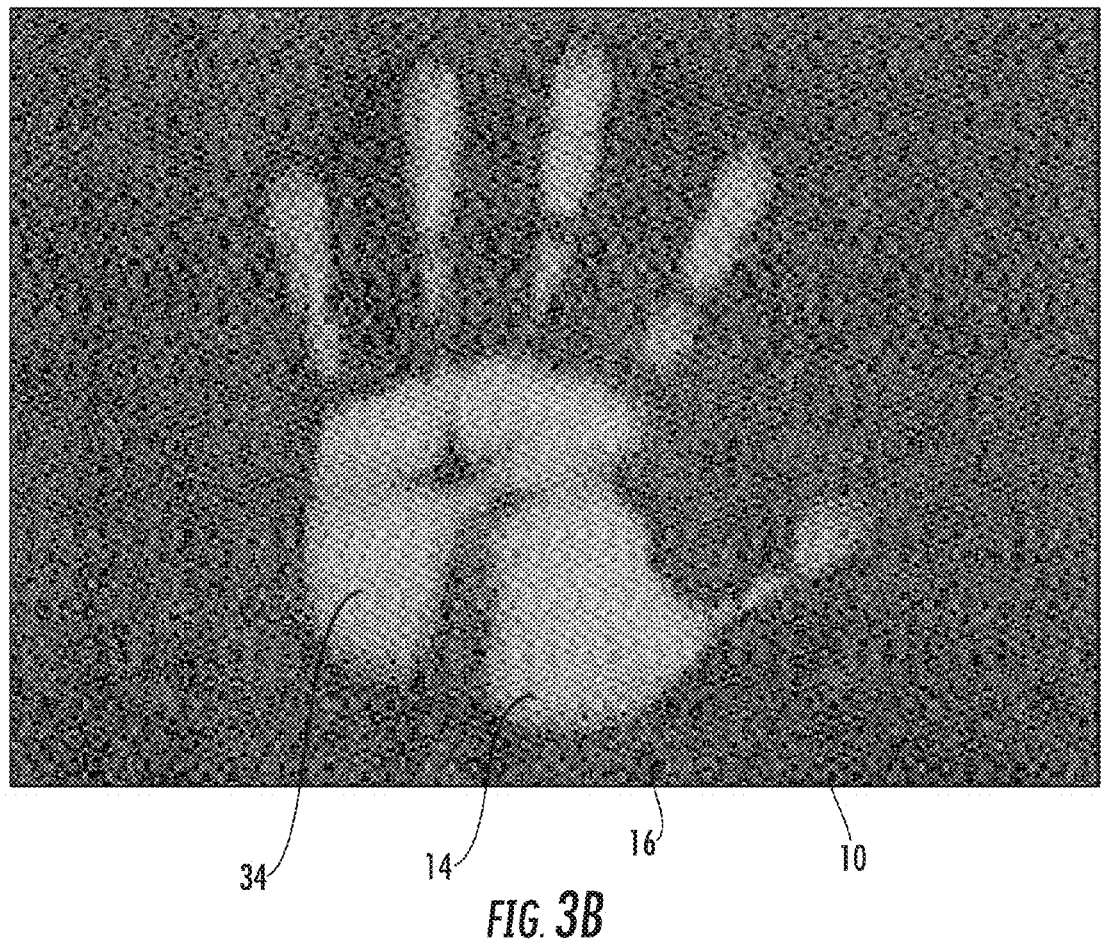
FIG. 3B illustrates a top plan view of a portion of another embodiment of an exercise mat according to the subject matter disclosed herein and similar to those illustrated in FIGS. 1-2C showing a registration of a practitioner's left hand on the exercise mat.

Referring to FIGS. 3A and 3B, the heat-sensitive imaging layer 14 can be a layer of thermo-chromic inks, pigments, liquid crystals below the transparent heat-activated protective layer 16. The heat-sensitive imaging layer 14 can provide a visual report of the quality of the connection of the foundation body parts when they contact the exercise, or yoga, mat. The thermo-chromic substances can be specifically heat set and designed to change color as more heat is transferred as a result of more foundation body part connecting to the yoga mat. In FIG. 3A, a hand print 32 from the firm placement of a practitioner's hand that served as a foundational body part against the protective layer 16 is shown in the heat-sensitive imaging layer 14. The thermochromic substances of the heat-sensitive imaging layer 14 are liquid crystals. As the liquid crystals are heated up to the turn different colors 32A, 32B, 32C within different temperature ranges. The differing colors 32A, 32B, 32C created by the intensity of mat connection can provide visual information of the quality of the body part's coverage and connection to the mat. As shown the blue color 32A can indicate a higher temperature range which, in turn, can designate that the hand was applied to the mat with greater pressure there and thus a greater heat transfer. Similarly, the green color 32B can indicate a mid-range temperature range and the red color 32C can indicate a lower range temperature range. The lower heat transfer at the indicated locations for the green color 32B and the red color 32C can mean that the body part was applied with less pressure or contact. In some cases as here, the lower heat transfer may be due to a lower heat in the body part extremity, for example, due to a lower amount of blood flow in that area.

Having a strong foundation body connection with the mat as indicated by the hand print 32 in FIG. 3A can cause the muscles, connective tissue, such as blood vessels, cartilage, and tendons, and nervous tissue to engage and align evenly around the skeletal structure to create solid supporting limbs. As the practitioner pushes down with aligned and efficient muscles, there is a matching force that enables the practitioner to push/pull up and lift the body weight off joints to create strong and powerful supporting limbs. There is less strain in the creation of the poses, as the muscles pull bones & body mass off joints, thus the likelihood of joint injury is highly reduced.

Similarly, FIG. 3B shows a hand print 34 from the firm placement of a practitioner's hand against the transparent protective layer 16 that is shown in the heat-sensitive imaging layer 14. The thermochromic substances of the heat-sensitive imaging layer 14 in FIG. 3B can be leuco dyes that change from a colored appearance to a clear appearance to reveal a color of the layer under the heat-sensitive imaging layer 14. In a similar manner as the liquid crystals that are used in the heat-sensitive imaging layer 14 in FIG. 3A, the leuco dyes used in the heat-sensitive imaging layer 14 in FIG. 3B can indicate whether a strong foundation body connection is made with the transparent protective layer 16 of the mat.

For example, FIGS. 4A and 4B show a practitioner's foundational connections of his hands and feet on the exercise mat that have registered by the heat-sensitive imaging layer 14 of the mat 10 for a period of time during and after use. The practitioner for example may be trying to obtain a downward facing dog yoga pose as shown in FIG. 1. The registrations 36, 38 of the practitioner's hands and feet on the mat 10 in FIG. 4A indicate good and correct foundational connections of the body parts, i.e., the hands and feet, against the mat 10. The registrations 42, 44 of the practitioner's hands and feet on the mat 10 in FIG. 4B indicate incorrect foundational connections of the body parts, i.e., the hands and feet, against the mat 10. More correct foundational connections of the feet and hands for the yoga pose are shown in dotted lines in FIG. 4B. Thus, the mat with its heat-sensitive imaging layer 14 can provide informational feedback about the foundational connections of the body parts to the practitioner after making the yoga pose.

If the foundational connections of the body parts are correct as shown in FIG. 4A and the practitioner has struck a proper yoga pose, then the practitioner can receive the visual feedback of the registrations of the footprints 36 and handprints 38 on the mat 10 and know that the yoga pose was proper. The practitioner can then start to associate the way the body felt when in the correct pose to begin to build the mental and muscle memory of that pose. Similarly, if the foundational connections of the body parts are incorrect as shown in FIG. 4B and the practitioner has not struck a proper yoga pose, then the practitioner can receive the visual feedback of the registrations of the footprints 42 and handprints 44 on the mat 10 and know that the body of the practitioner and the foundational connections of the body parts needs some adjustment to obtain the proper pose. The practitioner can then begin to change the positioning of the body parts and the body and weight distribution of the body as a whole to try and obtain the proper pose.

Exercise mats that include heat-sensitive imaging layers, such as those depicted in FIGS. 1-4B, may come with charts or guides that provide images of what the practitioner would likely see on the exercise mat based on the changes to the heat sensitive imaging layer when respective yoga poses for respective mats and temperatures of use are properly struck. Such charts and/or guides can be tailored to the construction of the exercise mat, the type of thermochromic substances are used in the heat-sensitive imaging layer, the type of yoga or exercise to be practiced, and/or the temperature at which the yoga or other exercise is to be practiced. For example, such a chart or guide can include an image such as FIG. 4A for the image created when striking a downward facing dog pose. In some embodiments, such charts or guides can include images that illustrate commonly encountered incorrect foundational connection images, such as the image in FIG. 4B for a downward facing dog pose. In such embodiments, the charts and/or guides can provide written or other visual information, such as photos, that can tell or show the practitioner what she or he is doing wrong and provide advice on how to correct the problem(s). Such charts and/or guides can accompany the yoga mat at the point of purchase or can be an added accessory that can be purchased separately. Thereby, the yoga mats that include heat-sensitive imaging layers and the charts and/or guides can comprise a yoga mat system.

Figure 5:
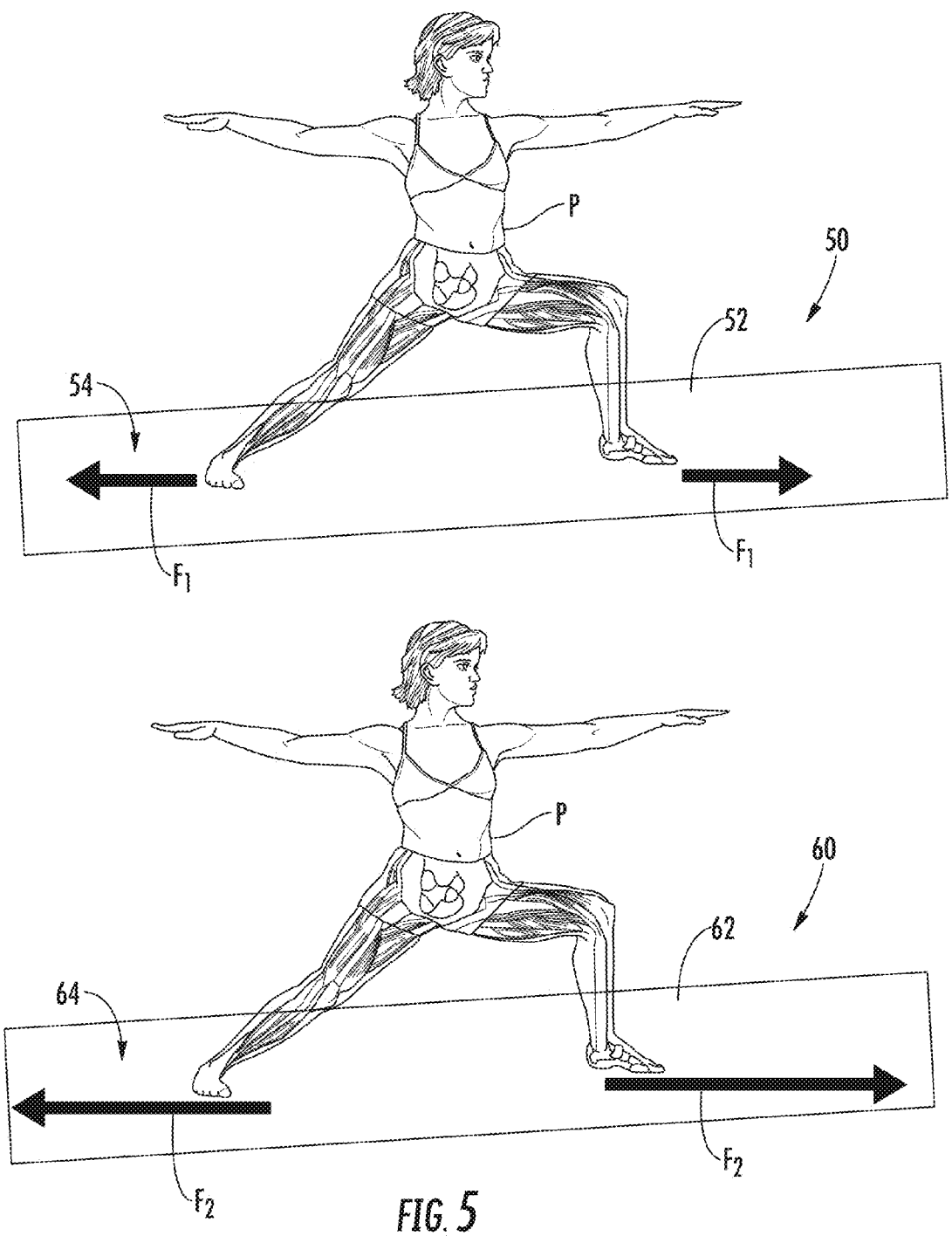
FIG. 5 illustrates perspective views of exercise mats of an embodiment of an exercise mat system according to the subject matter disclosed herein with the exercise mats in use by a practitioner.
Figure 6A:
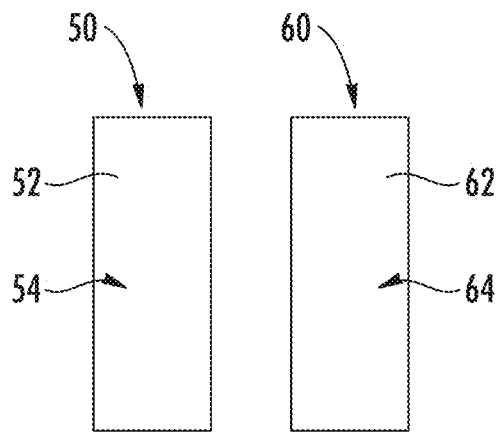
FIGS. 6A-6C illustrate schematic views of different embodiments of exercise mat systems according to the subject matter disclosed herein.

FIGS. 5 and 6A illustrate an exercise mat system that can be used by both novice and experienced practitioners. The yoga mat system can comprise a plurality of yoga mats 50, 60 with each respective yoga mat comprising a base layer and a top protective layer. A first yoga mat 50 can comprise a top protective layer 52 having a top outer surface 54 with a first initial tackiness represented by arrows $F_1$ and a first rate of increase in tackiness that occurs upon exposure to body heat of a practitioner P using the yoga mat. A second yoga mat 60 can comprise a top protective layer 62 having a top outer surface 64 with a second initial tackiness represented by arrows $F_2$ and a second rate of increase in tackiness that occurs upon exposure to body heat of a practitioner using the yoga mat. In particular, the arrows $F_1$ represents the amount of slip that the friction of the first initial tackiness would allow when the practitioner first assumes a yoga pose, such as the warrior two pose, on mat 50. Similarly, the arrows $F_2$ represents the amount of slip that the friction of the second initial tackiness would allow when the practitioner first assumes a yoga pose, such as the warrior two pose, on mat 60. As can been seen, the first initial tackiness as represented by arrows $F_1$ can be higher providing less slip than the second initial tackiness as represented by arrows $F_2$. The first yoga mat 50 can be for use by a beginner practitioner, while the second mat 60 can be for an experienced practitioner.

Thus, the yoga mat 60 can have a transparent heat-activated connect surface 64 on its top protective layer 62 that is initially smooth to the touch. Similarly, the yoga mat 50 can have a transparent heat-activated connect surface 54 on its top protective layer 52 that is initially smooth to the touch but that provides more grip than the connect surface 64 on the top protective layer 62 of the second yoga mat 60. As more of the body B of the practitioner P connects to the respective yoga mats 50 and 60, the more traction is created. This positive increase in traction or rate of increase of tackiness, from low traction to high traction, provides a mental and musculature memory that serves as feedback and information for the practitioner, as poses are held for periods of time or as the practitioner P moves from pose to pose. When using the yoga mats 50 or 60, slipping will occur since most practitioners, both novices and seasoned practitioners, do not connect their hands/feet fully to develop a broad surface area when creating their foundations. Whereas a regular yoga mat is grippy to first touch, the yoga mats 50 and 60 can be smoother to the touch, causing the practitioner to work their foundation body part harder by applying a broader hand or foot coverage to the yoga mat 50 and 60. However, yoga mat 50 can provide more traction initially than the yoga mat 60. In this manner, the novice can obtain the benefit of the added grip as he or she is learning the poses to help initially hold the pose.

Additionally, the first rate of increase of the tackiness (i.e., the speed at which the traction increases) of the outer surface 54 of the top protective layer 52 of the first yoga mat 50 can be greater than the second rate of increase of the tackiness of the outer surface 54 of the top protective layer 52 of the first yoga mat 50. In this manner the more experienced yoga practitioner can get a better work out once the experienced practitioner has built up his mental and muscular memory of the poses. At the same time, the novice using yoga mat 50 is less likely to fall out of the proper pose due to fatigue as the time the pose is held increases to allow the novice to build up his endurance to move on to the yoga mat 60. Thus, the top outer surface 54 of the top protective layer 52 of the first yoga mat 50 can have at least one of a higher initial tackiness or a faster rate of increase in tackiness than the top outer surface 64 of the top protective layer 62 of the second yoga mat 60.

Thereby, intention of the outer surfaces 54, 64 of the top protective layers 52, 62 of the yoga mats 50, 60 can teach the practitioner to work harder and apply more than their initial foundation body part coverage to the yoga mat. As more of the body connects to the yoga mat, additional muscles and connective tissue start to become active and engaged from point of contact to point of attachment. Before mat connection, what was a loose and misaligned mass of muscles and bones becomes a solid, aligned and strong structure for muscles, soft tissue and connective tissue to work with and mold around.

In some embodiments of the yoga mat system, instead of having two mats with different top protective layers, a single mat can be provided that includes two protective layers that form the outer surfaces of the mat on opposite sides. For example, a base layer can be provided with a top surface and bottom surface. A first protective layer having an outer surface with a first initial tackiness and a first rate of increase in tackiness can be secured over the top surface of the base layer and a second protective layer having an outer surface with a second initial tackiness and a second rate of increase in tackiness can be secured over the bottom surface of the base layer. Thereby, a novice and an experienced practitioner can use the same mat. Additionally, as a novice becomes more experienced, the novice can use the same mat by using a different side of the mat that has a different initial tackiness and/or rate of increase in tackiness. Such mats can have different constructions with the different layers of the mat being mirrored on either side of the base layer. For example, such mats can be constructed similar to those shown in FIGS. 2B and 2C. Such mats can have the respective set of layers shown in FIGS. 2B and 2C above the base layer and a similar set of layers below the base layer.

Figure 6B:
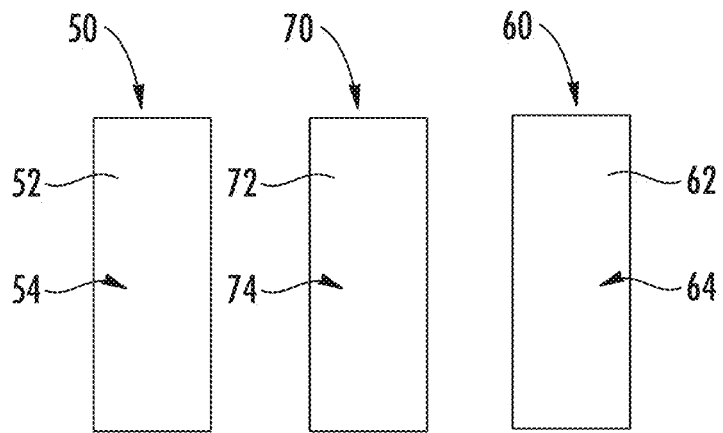
Figure 6C:
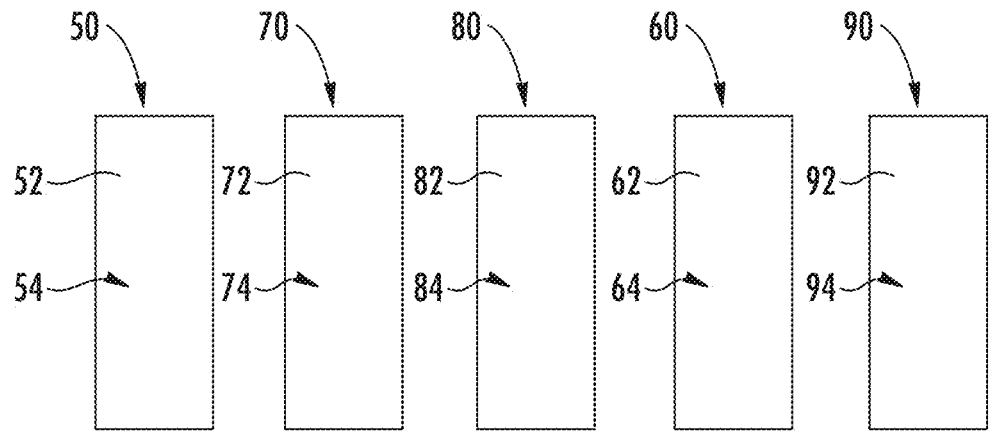

FIGS. 6B and 6C provide schematic drawings of other exercise mat systems that can be used by practitioners. Referring to FIG. 6B, the exercise mat system can comprise a plurality of exercise mats having a exercise mat 50 for a beginner, a exercise mat 70 for an intermediate practitioner, and a exercise mat 60 for an experienced practitioner. Each mat can have a different level of initial tackiness and/or a different rate of increase in tackiness due to body heat. As a above, the first exercise mat 50 can comprise a top protective layer 52 having a top outer surface 54 with a first initial tackiness and a first rate of increase in tackiness that occurs upon exposure to body heat of a practitioner P using the exercise mat 50 and the second exercise mat 60 can comprise a top protective layer 62 having a top outer surface 64 with a second initial tackiness and a second rate of increase in tackiness that occurs upon exposure to body heat of a practitioner using the exercise mat 60. The plurality of yoga mats further comprises the third exercisemat 70 comprising a top protective layer 72 having a top outer surface 74 with a third initial tackiness and a third rate of increase in tackiness that occurs upon exposure to body heat of a practitioner using the exercise mat for an intermediate level practitioner. Thus, the top outer surface 54 of the top protective layer 52 of the first exercise mat 50 can have a higher initial tackiness and/or a faster rate of increase in tackiness than the top outer surface 74 of the top protective layer 72 of the third exercise mat 70. Similarly, the top outer surface 74 of the top protective layer 72 of the third exercise mat 70 can have a higher initial tackiness or a faster rate of increase in tackiness than the top outer surface 64 of the top protective, layer 62 of the second exercise mat 60.

In a further example shown in FIG. 6C, the exercise mat system can comprise an offering of five yoga mats. The plurality of yoga mats can comprise a yoga mat 50 for a beginner, a third yoga mat 70 for a lower intermediate level practitioner, a fourth yoga mat 80 for an upper intermediate level practitioner, a yoga mat 60 for an experienced practitioner, and a fifth yoga mat 90 for an expert practitioner. As above, each mat in this advanced yoga mat system can have a different level of initial tackiness and/or a different rate of increase in tackiness due to body heat that provides different challenge to body control for the different levels of practitioners. Thus, the top outer surface 54 of the top protective layer 52 of the first yoga mat 50 can have a higher initial tackiness and/or a faster rate of increase in tackiness than the top outer surface 74 of the top protective layer 72 of the third yoga mat 70 for a lower intermediate level practitioner. Similarly, the top outer surface 74 of the top protective layer 72 of the third yoga mat 70 can have a higher initial tackiness and/or a faster rate of increase in tackiness than a top outer surface 84 of a top protective layer 82 of the fourth yoga mat 80 for an upper intermediate level practitioner. Similarly, the top outer surface 84 of the top protective layer 82 of the fourth yoga mat 80 can have a higher initial tackiness and/or a faster rate of increase in tackiness than the top outer surface 64 of the top protective layer 62 of the second yoga mat 60 for the experienced practitioner. Additionally, the top outer surface 64 of the top protective layer 62 of the second yoga mat 60 can have a higher initial tackiness and/or a faster rate of increase in tackiness than a top outer surface 94 of a top protective layer 92 of the fifth yoga mat 90 for an expert practitioner.

In the yoga mat system described above and shown in FIGS. 5-6C, the mats can have various layers between the outer protective layer and the base layer. In some system embodiments, such mats can have various patterns, images, and decorative options that can be on, in, or between the outer protective layer and/or the base layer. Further, the yoga systems with multiple mats can comprise double-sided mats that provide two different outer protective layers instead of single-sided mats with a single outer protective layer.

As can be seen by the examples provided herein, a variety of yoga mat systems can be provided. Further, in some embodiments, each respective yoga mat of the plurality of yoga mats can comprise a heat-sensitive imaging layer as described above between the top protective layer and the base layer. As described above, the heat-sensitive imaging layer can comprise one or more thermochromic substances that permit registration of placement of one or more body parts of a practitioner that are placed against the yoga mat. As provided herein, the goals of the exercise mat training tools are to bring awareness to the importance of maximum foundation body part connection to the yoga mat. The maximum foundation body part connection creates solid limb development from fully activated muscles of the foundation body part which sends a chain reaction to engage its connecting muscle and connective tissue groups, so that muscles can power up efficiently for any physical activity. By the practitioner feeling and seeing the foundation body part connections, a physical reality is provided that is the starting point and key to provide optimal mind and muscle memory for optimizing each yoga pose.

The outer surface of the top protective layer can be a heat-activated connect surface that encourages users to apply more force, mass, surface area to create heat, to change the tack of the upper layer which creates friction, and thus traction. The goal is to create a mental and muscle memory experience that enables the practitioner to witness as they connect more mass and surface area to the yoga mat, they create more solid limb support.

The biomechanical benefit of fully connected foundational body parts to the yoga mat is that the practitioner can physically experience the muscles of the supporting limbs becoming stronger as muscles align & become evenly distributed around their connecting skeletal frame. Another biomechanical benefit of the musculature and soft tissue being evenly distributed around optimally aligned connecting skeletal frame is the ease and ability for the practitioner to create the body shapes, i.e., yoga poses, a yoga practice requests. When the musculature and bones are misaligned, the distance for muscles and the connective tissue to develop around misaligned skeletal structure is greatly increased. Thus, over exertion, strain, lack of breath and injury is inevitable.

As stated above, beneath the heat-activated connect surface of the top protective layer is a layer of heat-sensitive imaging materials, such as thermochromic inks, dyes, pigments or heat-sensitive liquid crystals designed to change color at specific temperatures to provide specific visual information for the yoga practitioner of the quality of body part connection to the yoga mat. To master the physical practice of yoga, an awareness for the mind to bring attention to very specific parts of the body that are not considered in a typical fitness regime or daily life is key. When the practitioner has the visual information of how much and where the foundational body part is or is not connecting to the yoga mat, it often does not correlate with the mental image. With this new awareness, the practitioner is then able to choose a new action and recognize the corresponding biomechanical chain reaction that occurs, as a result. Images of optimal foundation body part visual impressions can be provided with the yoga mat as a training tool for goal setting for the practitioner. Such images can be in charts or guides that can be provided along with such yoga mats that include heat-sensitive imaging layers. By referencing the images of optimal foundation for each yoga pose, the practitioner can monitor his or her progress in obtaining the optimal foundation by monitoring his or her visual impression left on the mat in each pose each time the respective pose is struck.

It is possible to make a yoga mat with qualitative body connection feedback without using a top protective layer with a heat-activated connect surface for the upper layer. Using only a layer of heat-sensitive imaging materials can provide a visual record of foundational body part placement and pressure. With no heat-activated connect surface layer, the connection challenge is not controlled.

Alternatively, it is possible to make a yoga mat with qualitative body connection feedback without using heat-sensitive imaging layer by applying only a protective layer having a heat-activated connect surface as the upper layer with no heat-sensitive imaging layer underneath. Using only a top protective layer with a heat-activated connect surface can provide a mental and muscle memory of foundational body part placement and pressure. In particular, a yoga mat system with varying degrees of initial tackiness and increased tackiness due to body heat transfer to the surface where a body contacts the mat can provide a practitioner with a varying degree of learning opportunities with regards to obtaining and maintaining proper yoga poses. Far example, as discussed above, a series of mats can be offered to practitioners that can provide varying levels of initial tackiness and increased tackiness due to body heat based on the practitioner's level of yoga expertise. For example, a yoga mat for beginners and a yoga mat for experienced practitioners can be offered where the beginner yoga mat has a higher degree of initial tackiness and has a quicker rate of increase in tackiness when exposed to body heat than the yoga mat for the experienced practitioner. In this manner, the beginner is given more leeway in learning the correct positioning of the body and the connections of the foundational body parts on the mat in each yoga pose. Once the beginner begins to feel comfortable in a range of yoga poses, he or she can switch to the yoga mat for the experienced practitioner. A plurality of other yoga mats can be provided within the system to accommodate varying degrees of yoga proficiencies.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A performance enhancing yoga mat comprising:
a base layer having a top surface and bottom surface:
a heat-sensitive imaging layer on the top surface of the base layer, the heat-sensitive imaging layer permitting registration of placement of one or more body parts of a practitioner using the yoga mat against an upper surface of the yoga mat due to the heat of the body part in contact being transferred to the heat-sensitive imaging layer; and
a top protective layer having a top outer surface and bottom inner surface, the top protective layer secured on the yoga mat over the heat-sensitive imaging layer, the top protective layer comprising a heat activated connect surface that increases in tackiness when exposed to body heat from contact of body parts of a user against the top outer surface of the top protective layer.

2. The performance enhancing yoga mat according to claim 1, wherein the heat-sensitive imaging layer comprises a thermochromic substance that comprises at least one of thermochromic inks, dyes, pigments, or liquid crystals.

3. The performance enhancing yoga mat according to claim 2, wherein the heat-sensitive imaging layer comprises a print-receiving substrate on which the thermochromic inks, dyes, pigments, or liquid crystals are printable.

4. The performance enhancing yoga mat according to claim 2, wherein the heat-sensitive imaging layer comprises an encapsulation layer.

5. The performance enhancing yoga mat according to claim 1, wherein the top protective layer is a light permissive layer.

6. The performance enhancing yoga mat according to claim 1, wherein the heat-sensitive imaging layer is printable on the inner bottom surface of the top protective layer.

7. The performance enhancing yoga mat according to claim 1, wherein the top outer surface of the top protective layer comprises at least one of a smooth planar surface or a textured surface configured to provide a higher friction as compared to a smooth planar surface.

8. The performance enhancing yoga mat according to claim 1, further comprising an adhesive layer between the top protective layer and the base layer.

9. The performance enhancing yoga mat according to claim 1, wherein the heat-sensitive imaging layer is formed on the adhesive layer in a semi-cured state using one of the techniques of transfer printing, cold transfer printing, transfer printing, or movable printing.

* * * * *